US008775943B2

(12) United States Patent
Paek (10) Patent No.: US 8,775,943 B2
(45) Date of Patent: Jul. 8, 2014

(54) SYSTEM AND METHOD FOR REMOTE APPLICATION CONFIGURATION MANAGEMENT ON MULTIFUNCTION PERIPHERALS

(75) Inventor: Jeanette Y. Paek, Cypress, CA (US)

(73) Assignee: Samsung Electronics Co., Ltd., Gyeonggi-Do (KR)

( * ) Notice: Subject to any disclaimer, the term of this patent is extended or adjusted under 35 U.S.C. 154(b) by 1105 days.

(21) Appl. No.: 12/060,786

(22) Filed: Apr. 1, 2008

(65) Prior Publication Data
US 2009/0249215 A1   Oct. 1, 2009

(51) Int. Cl.
G06F 3/0481   (2013.01)

(52) U.S. Cl.
USPC .......................................................... 715/740

(58) Field of Classification Search
USPC .......................................................... 715/740
See application file for complete search history.

(56) References Cited

U.S. PATENT DOCUMENTS

| | | | |
|---|---|---|---|
| 5,913,218 A | 6/1999 | Carney et al. | |
| 7,296,152 B1 * | 11/2007 | MacPherson et al. | 713/168 |
| 7,603,431 B2 * | 10/2009 | Campbell et al. | 709/217 |
| 7,734,285 B2 * | 6/2010 | Chmaytelli et al. | 455/419 |
| 7,884,958 B2 * | 2/2011 | Otsuka et al. | 358/1.15 |
| 2002/0095595 A1 * | 7/2002 | Christopherson et al. | 713/200 |
| 2002/0156894 A1 * | 10/2002 | Suorsa et al. | 709/226 |
| 2003/0065773 A1 * | 4/2003 | Aiba et al. | 709/224 |
| 2005/0156735 A1 * | 7/2005 | Humphries et al. | 340/539.13 |
| 2005/0164692 A1 * | 7/2005 | Roth et al. | 455/419 |
| 2006/0055963 A1 * | 3/2006 | Otsuka et al. | 358/1.15 |
| 2007/0073772 A1 * | 3/2007 | Blue et al. | 707/104.1 |
| 2007/0288611 A1 * | 12/2007 | Serceki et al. | 709/221 |
| 2008/0010358 A1 * | 1/2008 | Jin | 709/207 |
| 2008/0079286 A1 * | 4/2008 | Ferlitsch et al. | 296/186.1 |
| 2008/0100864 A1 * | 5/2008 | Kadowaki | 358/1.15 |
| 2008/0125219 A1 * | 5/2008 | Williams et al. | 463/31 |
| 2008/0205295 A1 * | 8/2008 | Conoboy | 370/252 |
| 2008/0235357 A1 * | 9/2008 | Gustafsson | 709/220 |
| 2009/0217185 A1 * | 8/2009 | Goldfarb | 715/763 |
| 2009/0287798 A1 * | 11/2009 | Law et al. | 709/220 |

FOREIGN PATENT DOCUMENTS

| | | | |
|---|---|---|---|
| EP | 1205843 A2 | 5/2002 | |
| GB | 2423602 A | 8/2006 | |

OTHER PUBLICATIONS

European Search Report for Application No. 09156762.8 dated Jul. 17, 2012.

* cited by examiner

Primary Examiner — Ryan Pitaro
(74) Attorney, Agent, or Firm — IP Investment Law Group (57) ABSTRACT

The invention relates to multifunction peripherals (MFPs). More particularly, the invention relates to remote application configuration management of MFPs. A remote application configuration manager may extract configuration information from custom applications, organize a user interface based on the respective configuration information, and receive and store parameter values with which the respective custom applications may be executed.

21 Claims, 6 Drawing Sheets

SYSTEM AND METHOD FOR REMOTE APPLICATION CONFIGURATION MANAGEMENT ON MULTIFUNCTION PERIPHERALS

BACKGROUND OF THE INVENTION

1. Field of the Invention

The invention relates to multifunction peripherals (MFPs). More particularly, the invention relates to remote application configuration management of MFPs.

2. Description of the Related Art

Multifunction peripheral devices provide a versatile function set upon which various applications may be run. Hence, there is a need for developing an embedded software platform for MFPs upon which custom applications may be executed to utilize the versatile function set of MFPs. Furthermore, there is a need to manage the life cycle of such applications, as well as to manage configuration settings for the respective applications. Moreover, because some custom applications may utilize configuration settings during the runtime environment, there is a need for a device fleet management facility for Information Technology (IT) administrators to be able to configure applications and to dynamically manage their configurations on respective devices. In order to alleviate the burden of configuring applications one by one, there is also a need for device fleet management facility which provides a way to configure applications on all or some devices simultaneously.

SUMMARY OF CERTAIN INVENTIVE ASPECTS

In general, aspects of the invention relate to multifunction peripherals (MFPs). More particularly, aspects of the invention relate to remote application configuration management of MFPs.

One aspect is a method of remote application configuration management, the method comprising: extracting configuration information from an application corresponding to at least one device, the configuration information comprising configuration parameters; configuring a user interface based on the extracted configuration information, wherein the input interface corresponds to a device remote to the at least one device; receiving, via the user interface, parameter values corresponding to the configuration parameters; saving the parameter values into persistent storage; and executing an application based on the parameter values.

Another aspect is a device fleet management utility comprising: an extraction module configured to extract at least one configuration parameter from an application corresponding to at least one device; an interface module configured to configure a user interface based on the at least one extracted configuration parameter, the interface module further configured to receive, via the user interface, at least one parameter value corresponding to the at least one extracted configuration parameter; and a device configuration module configured to send the at least one parameter value to a device that has registered the application; wherein at least the interface module and the device configuration module reside on a device that is remote to the at least one device.

Still another aspect is an MFP application with extractable configuration parameters, the MFP application comprising: executable instructions configurable by at least one parameter; and a configuration property file comprising information from which a device management utility can configure a user interface to receive parameter values corresponding to the at least one parameter.

Yet another aspect is an MFP device configured to register applications that can be configured remotely, the MFP device comprising: at least one configurable application module comprising executable instructions configurable by at least one parameter, the at least one configurable application module further comprising a configuration property file with information from which a device management utility can configure the at least one configurable application module.

These and other features will now be described with reference to the drawings summarized above. The drawings and the associated descriptions are provided to illustrate embodiments of the invention and not to limit the scope of the invention. Throughout the drawings, reference numbers may be reused to indicate correspondence between referenced elements. In addition, the first digit of each reference number generally indicates the figure in which the element first appears.

DETAILED DESCRIPTION OF CERTAIN PREFERRED EMBODIMENTS

Various aspects and features of the invention will become more fully apparent from the following description and the pending claims taken in conjunction with the foregoing drawings. In the drawings, like reference numerals indicate identical or functionally similar elements. The drawings, associated descriptions, and specific implementations are provided to illustrate the embodiments of the invention, but not to limit the scope of the disclosure.

Because of the nature of custom applications being "custom," configuration settings for such applications may also be "custom" in nature. In order to facilitate the "custom" nature, such custom applications need to provide custom configuration parameters in a way that a device fleet management utility can utilize to provide a sensible User Interface (UI) tool for Information Technology (IT) administrators to use.

Embodiments of the invention include systems, methods, and software for declaring configuration settings of custom applications and for utilizing such declared settings so that those settings can be managed remotely and dynamically.

Configuration parameters that a custom application utilizes may be declared in custom application files. Application developers can follow specified rules and conventions for properly declaring and using the parameters during the life cycle of the application.

During installation, a device fleet management utility can get the configuration parameters from an application file. Then, the utility can display the custom configuration parameters, for example, in a Web UI so that IT administrators can easily set/get the configuration data for the application for a device or a group of devices. During the application installation, IT administrators can set the configuration (parameter) values that the application should run with, and those configuration (parameter) values may be stored persistently in the device. In some embodiments, the values are stored after the application registers itself to the device. After the application is installed and running in the device, its configuration settings can be managed remotely by the device fleet management tool via communicating with an application management service running in the device.

Because it may be advantageous to provide custom applications for multifunction peripheral (MFP) devices, and to remotely configure such custom applications, the embodiments of the invention described below are directed to the remote configuration of custom applications on MFP devices. In other embodiments, however, custom applications installed on devices other than MFP devices may be remotely configured and managed.

In general, an MFP device is a single integrated device configured to perform two or more functions, including, without limitation, scanning, copying, printing, faxing, combinations of the same, and the like. The functionality of an MFP device may be accessed over a network, including, for example, the Internet, or a LAN, or at the device itself. An MFP device may be configured with sufficient memory to queue jobs waiting to be processed. It will be appreciated that MFP devices may be configured to perform in a variety of different network and standalone computing environments. Although some of the embodiments described herein relate to an MFP device, other embodiments may be implemented with other peripheral devices, such as single-function devices, including for example printers and scanners.

It will be appreciated by one skilled in the art that many of an MFP's functions, including both native as well as custom applications, may be executed by one or more modules in various suitable computer-readable media. The word module refers to logic embodied in hardware or firmware, or to a collection of software instructions, possibly having entry and exit points, written in a programming language, such as, for example, C, C++, and/or Java. A software module may be compiled and linked into an executable program, installed in a dynamically linked library, or may be written in an interpreted programming language such as, for example, BASIC, Perl, or Python. It will be appreciated that software modules may be callable from other modules or from themselves, and/or may be invoked in response to detected events or interrupts. Furthermore, software modules may be fully downloadable applications written in programming languages such as, for example, C, C++, and/or Java. Software instructions may be embedded in firmware, such as an EPROM. It will be further appreciated that hardware modules may be comprised of connected logic units, such as gates and flip-flops, and/or may be comprised of programmable units, such as programmable gate arrays or processors. The modules described herein are preferably implemented as software modules, but may be represented in hardware or firmware. Moreover, although in some embodiments a module may be separately compiled, in other embodiments a module may represent a subset of instructions of a separately compiled program, and may not have an interface available to other logical program units.

Figure 1:
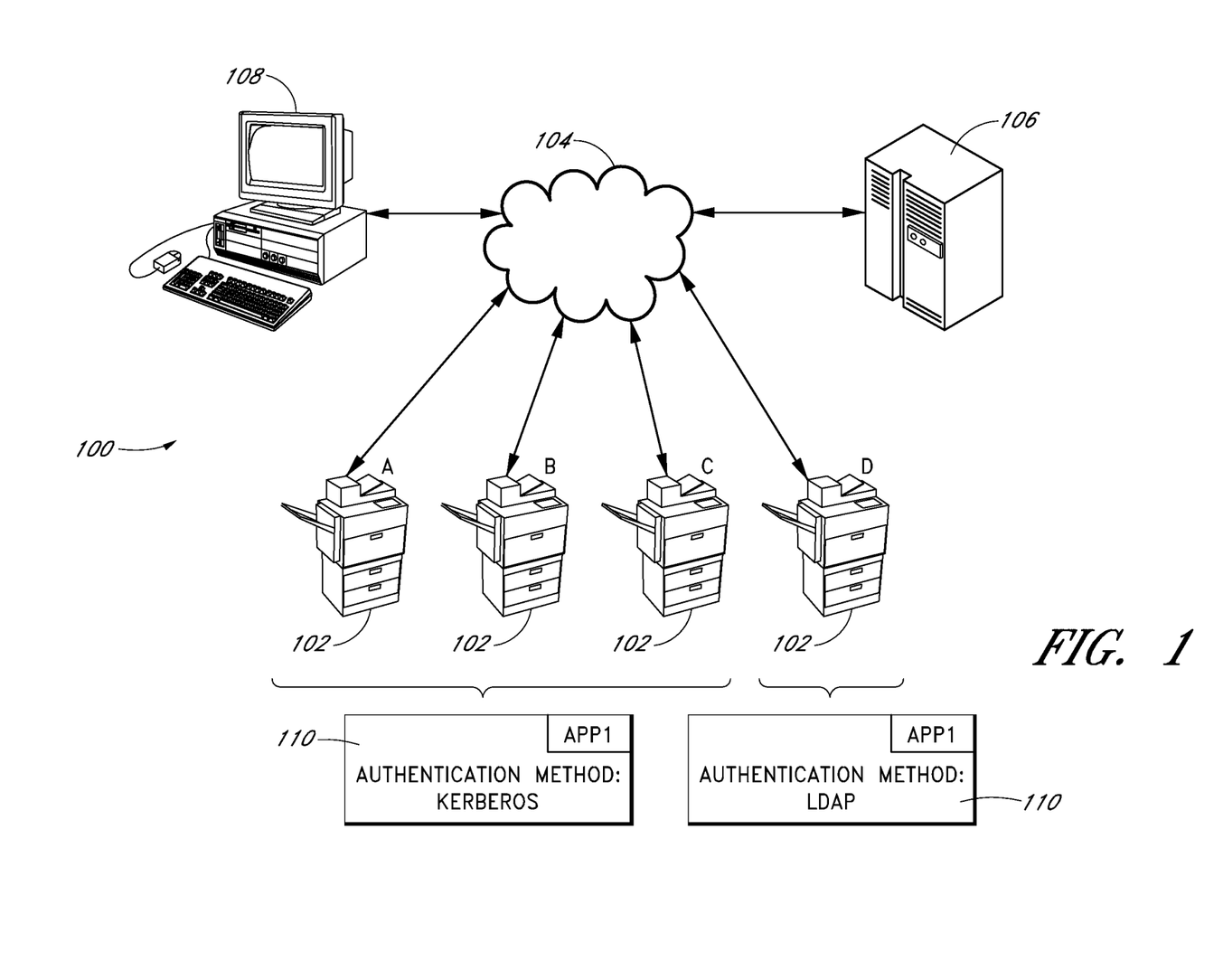
FIG. 1 illustrates one embodiment of remote application configuration management on multifunction peripherals.

FIG. 1 illustrates one embodiment of remote application configuration management on MFPs. A remote configuration system 100 may include various MFPs 102 connected to a network 104. In the illustrated embodiment, MFPs 102 are managed by a device fleet management utility 106. The device fleet management utility 106 communicates with the MFPs 102 via the network 104. An administrator may use a remote computer 108, among other things, to install, configure, start/stop, and uninstall applications on the MFPs 102 via the device fleet management utility 106. The remote computer 108 may communicate with the device fleet management utility 106 via the network 104. Although in the illustrated embodiments, a user, such as an administrator, uses a remote computer 108 to manage custom applications through a device fleet management utility 106, in other embodiments a user may manage custom applications directly with a user interface to a device fleet management utility 106. In other words, in some embodiments, the device fleet management utility 106 is not accessed by a remote computer, but rather by a local user interface. For example, the device fleet management utility 106 may be a Web based application that can be accessed via any suitable Web browser, and the MFPs 102 may have browser based user interfaces, making it possible for a user, such as an administrator, to access the device fleet management utility 106 via a local device user interface.

As discussed, an administrator may manage MFPs 102 with a remote computer 108 using the functionality of the device fleet management utility 106. The device fleet management utility 106 may be configured to receive instructions from the administrator using the remote computer 108 and manage the MFPs 102 accordingly. In some embodiments, it may be advantageous to allow an administrator to remotely configure an application that is running on multiple MFPs 102 simultaneously. For example, an administrator may decide to configure an application 110, such as App1, to have the same "Authentication Method." Thus, in the illustrated embodiment, an administrator configured MFP[A] 102, MFP[B] 102, and MFP[C] 102 to have the same authentication method: Kerberos. The "Authentication Method" may be one of many configurable parameters specific (that is, "custom") to App1. Accessing the device fleet management utility 106, via the remote computer 108, an administrator may also simultaneously configure other MFPs 102 to have a different "Authentication Method." For example, an administrator may configure MFP[D] 102 to have an authentication method of "LDAP."

Figure 2:
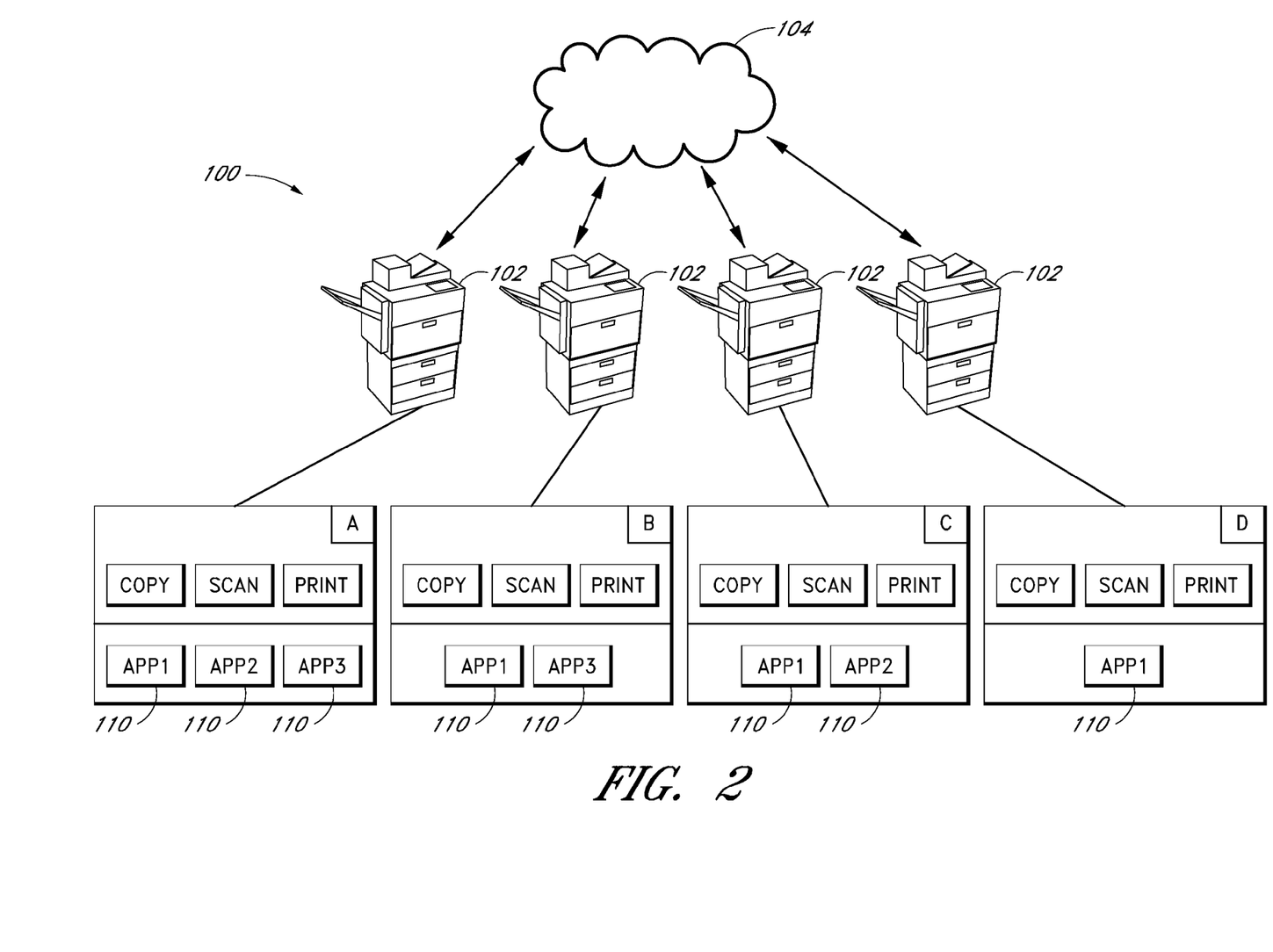
FIG. 2 illustrates one embodiment of remote application configuration management with different installed applications.

FIG. 2 illustrates one embodiment of remote application configuration management with different installed applications. In the illustrated embodiment, the remote configuration system 100 comprises four MFPs 102. The MFPs 102 may be configured with different applications, including different custom applications. In the illustrated embodiment, MFP[A] 102 is configured with three standard MFP operations: copy, scan, and print. MFP[A] 102 is also configured to execute three custom applications: App1, App2, and App3. In the illustrated embodiment, MFP[B] 102 is similarly configured with three standard MFP operations, but is configured with only two custom applications: App1 and App3. In the illustrated embodiment, MFP[C] 102 is also configured with three standard MFP operations and two custom applications but the custom applications are App1 and App2. In the illustrated embodiment, MFP[D] 102 is configured with three standard MFP operations, but is configured with only one custom application, App1. An administrator may access the device fleet management utility 106, via the remote computer 108, in order, among other things, to install, configure, start/stop, and uninstall custom applications on MFPs 102.

Although in the illustrated embodiment, the MFPs 102 share the same three standard MFP operations, in other embodiments the devices managed by the device fleet management utility 106 may have different standard functions, in addition to different custom applications. Similarly, the MFPs 102 may have the same custom applications. One skilled in the art will appreciate that there are many suitable ways to configure systems with homogeneous and heterogeneous devices, as well as heterogeneous and homogeneous configurations of custom applications.

Figure 3:
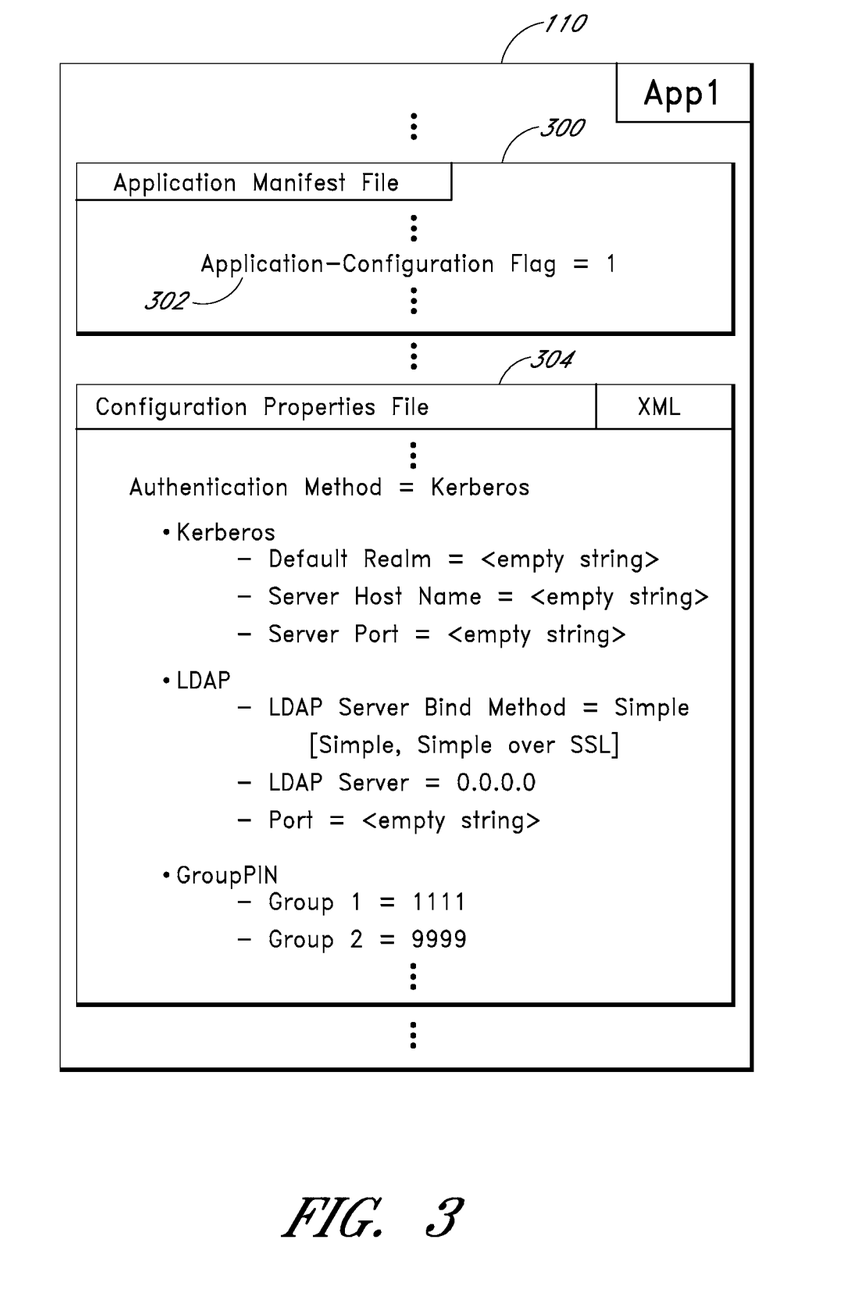
FIG. 3 illustrates one embodiment of an application of a custom application 110 that may be configured remotely.

FIG. 3 illustrates one embodiment of a custom application 110 that may be configured remotely. In some embodiments, respective custom applications 110 may include some indication that a particular custom application 110 is configurable, and may also include configuration information. In the illustrated embodiment, custom application 110 compromises an application manifest file 300, which includes an application-configuration flag 302. If the application-configuration flag 302 indicates that the custom application 110 configuration properties file, may comprise Extensible Markup Language (XML) code. It will be appreciated by one skilled in the art that there are many suitable formats, languages, and so forth in which to provide configuration information in a configuration properties file 304. For example, configuration settings could be provided as simple "Key-Value Pairs" and then the look and feel of the user interface could be defined using Cascading Style Sheets (CSS). Additionally and/or alternatively, embodiments might employ the Extensible Stylesheet Language Transformation (XSLT).

The following is exemplary XML code that defines the configuration information illustrated in FIG. 3:

```
<?xml version="1.0" encoding="UTF-8"?>
<ApplicationConfiguration xsi:noNamespaceSchemaLocation="appconfig.xsd"
xmlns:xsi="http://www.w3.org/2001/XMLSchema-instance">
    <ConfigElement Values="Kerberos, LDAP, GroupPIN" ValueType="SelectSingleValue"
    Name="Authentication Method" DefaultValue="Kerberos">
        <ConfigNode Values="Default Realm, Server HostName, Server Port"
        ValueType="DisplayValue" Name="Kerberos" DefaultValue="">
            <ChildNode Values="" ValueType="InputString" Name="DefaultRealm"
            DefaultValue=""/>
            <ChildNode Values="" ValueType="InputString" Name="Server HostName"
            DefaultValue=""/>
            <ChildNode Values="" ValueType="InputString" Name="Server Port"
            DefaultValue=""/>
        </ConfigNode>
        <ConfigNode Values="LDAP Server Bind Method, LDAP Server, Port"
        ValueType="DisplayValue" Name="LDAP" DefaultValue="">
            <ChildNode Values="Simple, Simple over SSL"
            ValueType="SelectSingleValue" Name="LDAP Server Bind Method"
            DefaultValue="Simple"/>
            <ChildNode Values="" ValueType="InputString" Name="LDAP Server"
            DefaultValue="0.0.0.0"/>
            <ChildNode Values="" ValueType="InputString" Name="Port"
            DefaultValue=""/>
        </ConfigNode>
        <ConfigNode Values="Group 1, Group2" ValueType="DisplayValue"
        Name="GruopPIN" DefaultValue="">
            <ChildNode Values="" ValueType=" InputString" Name="Group 1"
            DefaultValue="1111"/>
            <ChildNode Values="" ValueType="InputString" Name="Group 2"
            DefaultValue="9999"/>
        </ConfigNode>
    </ConfigElement>
</ApplicationConfiguration>
``` is configurable, then the custom application 110 may also include a configuration properties file 304, which may include configuration information for configuring custom application 110. In the illustrated embodiment, application-configuration flag 302 is a Boolean value. When the application-configuration flag 302 indicates a positive value, such as "1," then the custom application 110 is configurable. When the application-configuration flag 302 indicates a negative value, such as "0," then the custom application 110 is not configurable. One skilled in the art will appreciate that there are other suitable ways for indicating whether or not a custom application 110 is configurable. For example, a custom application could include a configuration properties file 304, if the application is configurable, but not include such a file if the application is not configurable.

The configuration properties file 304 specifies configuration information for a custom application 110 that is configurable. In addition to providing configurable settings, the properties file 304 provides the rules as to how each configuration setting should be presented to the user, such as an information technology (IT) administrator, on the device fleet management tool user interface. In some embodiments, a The configuration information illustrated in FIG. 3—and encoded in the above XML script—comprises information regarding the configuration of an "Authentication Method" parameter. The "Authentication Method" parameter is a closed parameter (allowing for only one possible value to be selected) comprising three possible fixed values: Kerberos, LDAP, and GroupPIN. In other words, there are three possible, defined authentication methods from which a user, such as an administrator, may choose. By providing a rule that only one selection can be made, the user may be presented with user interface controls such as a radio button, which enables only one selection from a list. The configuration properties file 304 also specifies "Kerberos" as the default value—that is, the default authentication method.

Additionally, the three possible authentication methods have parameters associated with them. The "Kerberos" authentication method comprises three parameters: Default Realm, Server Host Name, and Server Port. These three parameters comprise string values. In other words, a user may specify a suitable string value (a string of text characters) for each respective parameter. In the illustrated embodiment, each of these three parameters has an empty default value. In the XML script above, this is denoted by a set of closed quotation marks—that is, a set of quotation marks with no characters in between the marks. In FIG. 3, this is denoted by <empty string>, indicating that there is no specified value for the string variable. In a user interface screen, an empty string might be represented by omitting any characters, leaving empty or blank a space displaying the value. A user may be prompted to assign a value to an empty parameter.

The "LDAP" authentication method has three associated parameter values: LDAP Server Bind Method, LDAP Server, and Port. The LDAP Server Bind Method parameter is a closed parameter comprising two possible values: Simple and Simple over SSL. In the illustrated embodiment, the default value for the LDAP Server Bind Method parameter is "Simple." The LDAP Server parameter comprises an open string value. In the illustrated embodiment, the default value for the LDAP Server parameter is "0.0.0.0". The Port parameter also comprises an open string value. In the illustrated embodiment, the default value of the Port parameter is an empty string, as described above.

The "GroupPIN" authentication method has two parameters associated with it: Group 1 and Group 2. The Group 1 and Group 2 parameters comprise open string values. The default value of the Group 1 parameter is "1111," and the default value of the Group 2 parameter is "9999".

Generally speaking, configuration information, such as the configuration information described above, comprises configuration parameters, default values, and relations between different parameters. In other words, configuration information comprises parameters, default values, and rules for defining the kind of value a parameter may be and how particular parameters relate to one another. For example, as described above, configuration information may comprise the following parameters: Authentication Method, Default Realm, Server Host Name, Server Port, LDAP, Server Bind Method, LDAP Server, Port, Group 1, and Group 2. These parameters may include a respective default value, including default values indicting no default value, such as an empty string. Additionally, the above-described configuration information included rules defining the acceptable values for particular configuration parameters, as well as the relationships between parameter values. For example, the configuration information specified that the "Authentication Method" parameter was a closed parameter with three possible defined values: Kerberos, LDAP, and GroupPIN. The configuration information also defined parameter values such as "Default Realm" as capable of storing a string of text characters, possibly provided by a user, such as an administrator. Furthermore, the configuration information associated certain parameters with other parameters and/or parameter values. For example, the Default Realm parameter was associated with the Kerberos value of the "Authentication Method" parameter.

Figure 4:
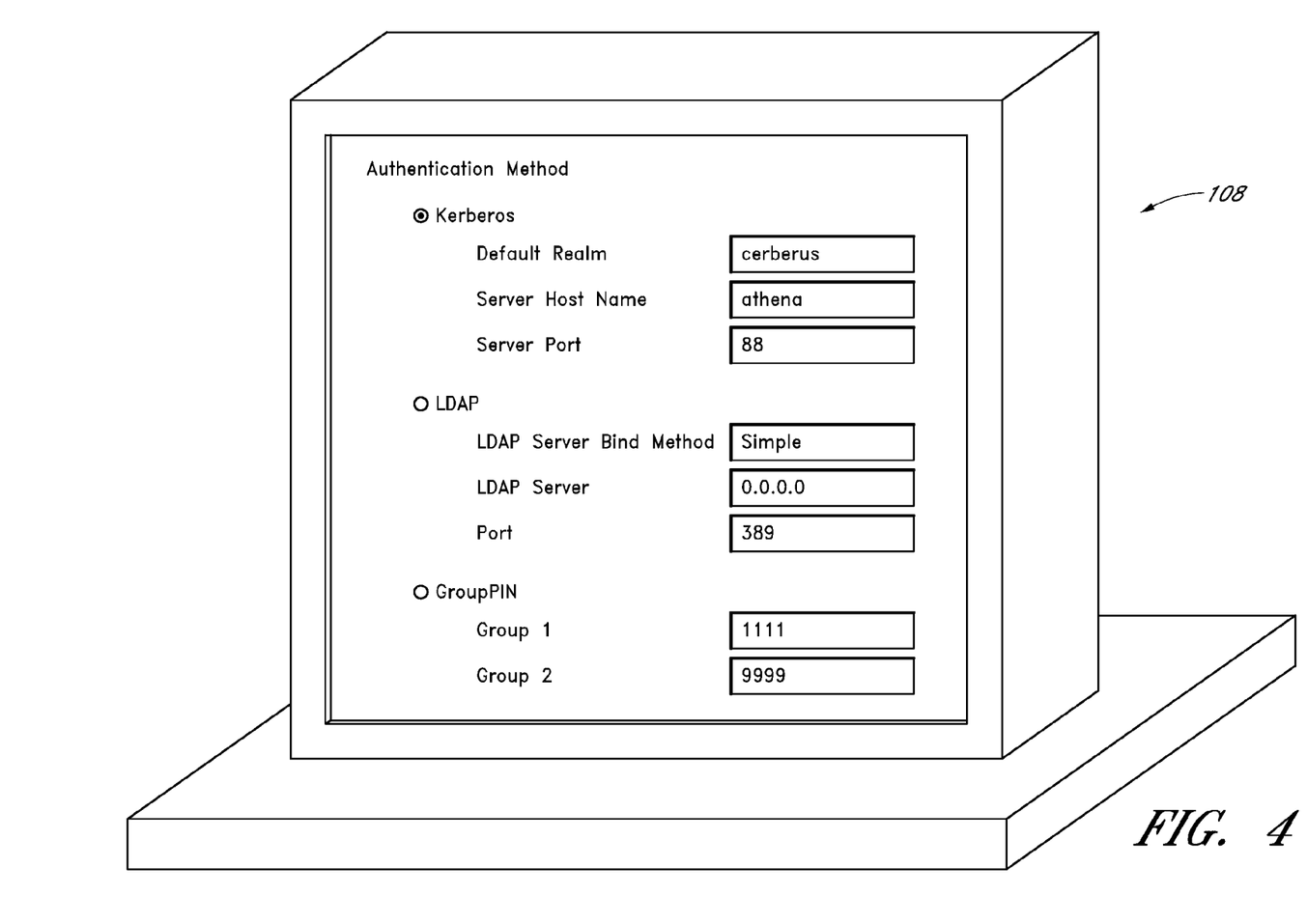
FIG. 4 illustrates one embodiment of a user interface displaying configuration parameters for a custom application.

FIG. 4 illustrates one embodiment of a user interface displaying configuration parameters for a custom application. As described above with respect to FIG. 3, custom applications include bundled configuration information, which includes the configurable parameters available to the user, as well as the rules and default values for displaying the parameters to the user. To use this bundled information, the device fleet management utility extracts the bundled information from the application. In one embodiment, the device fleet management utility extracts a configuration properties file from a Java archive (JAR) using a standard Java method. It will be appreciated by one skilled in the art that there are many suitable ways to bundle and extract configuration information in custom applications.

After configuration information has been extracted from a custom application 110, a device fleet management utility 106 can build a user interface using the configuration information. This user interface may be displayed to, for example, an administrator using a remoter computer 108 in order to configure custom application(s) 110 operating on respective MFP(s) 102. The configuration information displayed in FIG. 4 coincides with the configuration information described above with respect to FIG. 3. In FIG. 4, a user, such as an administrator, is in the process of configuring a custom application 110, such as App. 1. In the illustrated embodiment, the user has changed the values of the parameters associated with the "Kerberos" authentication method. Specifically, the user has changed the "Default Realm" parameter from its default value of an empty string to the value of "cerberus". The user has also changed the "Server Host Name" parameter to the string value of "athena", and the "Server Port" parameter to the string value of "88". Furthermore, the administrator has changed the Server Port parameter associated with the "LDAP" authentication method from its default value of the empty string to the string value of "389".

When an administrator makes changes to configuration parameters through a user interface, the remote computer 108 may communicate, via network 104, with a device fleet management utility 106, which may then communicate these parameter value changes to MFP(s) 102. MFP(s) 102 may store modified parameter values in persistent storage for retrieval during the execution of respective custom applications 110. It will be appreciated by one skilled in the art, however, that there are other suitable means for storing the changed parameter values. For example, a remote computer 108 or a device management utility 106 may store the changed parameter values for respective custom applications, and MFP(s) 102 may then request the current parameter value when the respective custom applications 110 are executed on the MFPs 102. In still other embodiments, copies of the parameter values will be stored on both the device, such as an MFP 102, and on a remote server computer operating, for example, the device fleet management utility 106. When a value discrepancy arises between the stored copies, in some embodiments the value in the device itself is selected as the value, as the device setting can be changed by a walk-up user, such as an administrator. For example, if an administrator walks up to a device and changes the value of a parameter via a device-based user interface, then the server-side copy of the parameter may not be current. In some embodiments, the device value may override any value stored elsewhere. Furthermore, in some embodiments, when there is an update to a parameter value in one location (for example, the device), the remaining parallel values in the other locations (for example, the server operating a device fleet management utility) are synchronized to avoid discrepancies. One skilled in the art will appreciate that there are suitable ways to synchronize values and to reconcile discrepancies.

Figure 5:
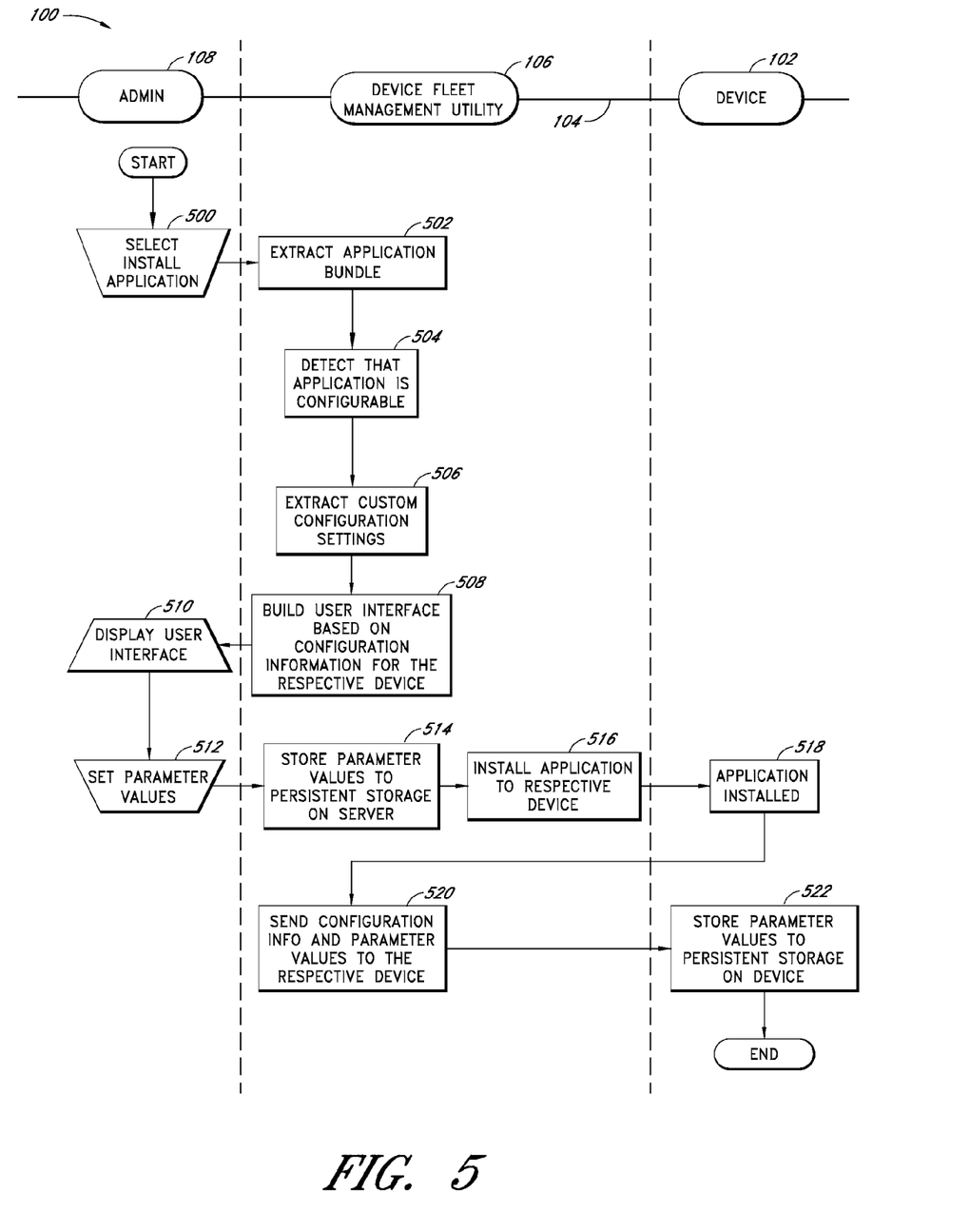
FIG. 5 illustrates a flow chart of one embodiment of remotely configuring custom applications.

FIG. 5 illustrates a flow chart of one embodiment of remotely configuring custom applications. The flow chart illustrates the different operations executed on the components of the configuration management system 100, including the remote computer 108, the device fleet management utility 106, and the MFPs 102, which are connected via network 104. In state 500, a user, such as an administrator, using remote computer 108 requests to install a custom application on one or more MFPs 102. It will be appreciated by one skilled in the art that an administrator may use remote computer 108 in various suitable ways to communicate with the device fleet management utility 106. For example, the remote computer 108 may have a client communication installed that communicates with a server component of the device fleet management utility 106. In other embodiments, the administrator may use a Web browser in remote computer 108 to access a Web portal provided by the device fleet management utility 106. Thus, in state 500, the remote computer 108 processes a request to install a custom application 110 on one or more MFPs 102. This request is transmitted to the device fleet management utility 106.

In state 502, the device fleet management utility 106 extracts the application bundle for the application selected to be installed. For example, the device fleet management utility 106 may keep a library of custom applications that may be installed on one or more MFPs 102, and may extract the selected application and unpack the bundled application. It will be appreciated by one skilled in the art that other suitable configurations are possible. For example, an administrator may load an installation package via remote computer 108. This installation package may then be communicated to the device fleet management utility 106, which in turn extracts the installation package. In still other embodiments, other devices may be used to load the installation package for respective custom applications 110.

In state 504, the device fleet management utility 504 detects that the application is configurable. For example, as described in greater detail above with respect to FIG. 3, a custom application 110 may include an application manifest file 300, which may indicate whether or not the custom application 110 is configurable using, for example, an application-configuration flag 302. If the application is not configurable (not illustrated), then the application may be installed without configuring the parameters, as described below.

After detecting that the application is configurable, in state 506, the processor for the device fleet management utility 106 extracts the configuration settings from the application bundle. As described in greater detail above with respect to FIG. 3, the configuration information for a respective custom application 110 may be stored in a configuration properties file 304. As described above with respect to FIG. 3, the configuration information may comprise configuration parameters, default values, and rules defining the values and relationships of the parameters.

In state 508, the device fleet management utility 106 builds a user interface based on the configuration information. As described above in greater detail with respect to FIG. 3, the configuration information may comprise XML instructions. Thus, the device fleet management utility 106 may use the XML instructions to build a user interface to display the configuration parameters of a respective custom application 110. Using the rules and the default values, the device fleet management utility 106 can structure the configuration parameters appropriately and assign to them initial values. After the device fleet management utility 106 has built a user interface based on the configuration information of the respective custom application 110, in state 510, the remote computer 108 displays the user interface to, for example, an administrator.

In state 512, an administrator uses a remote computer 108 to enter parameter values for the configuration parameters of a respective custom application 110. These values are communicated to the device fleet management utility 106 which stores the parameter values, in state 514, to persistent storage on, for example, the server computer executing the device fleet management utility 106. In one embodiment, persistent storage may comprise non-volatile (battery backed) random access memory (RAM), and in other embodiments other suitable forms of persistent storage may be used. In state 516, the device fleet management utility 106 sends the application to the respective MFP(s) 102 for installation, and, in state 518, the respective MFP(s) 102 installs the respective custom application 110. Then, in state 520, the server component of the device fleet management utility 106 sends to the respective MFP(s) 102 the configuration information, including the parameter values entered by the administrator. In state 522, the respective MFP(s) 102 store the parameter values to persistent storage. As described above, there may be other suitable ways to store the parameter values. For example, in some embodiments, the parameter values may be stored in persistent storage residing on the server executing the device fleet management utility 106, on the remote computer 108, or on other devices. If the parameter values are not stored on the respective MFP(s) 102, then the device fleet management utility 106 may communicate the parameter values to the respective MFP(s) 102 when the respective custom application is started and/or otherwise executed.

Figure 6:
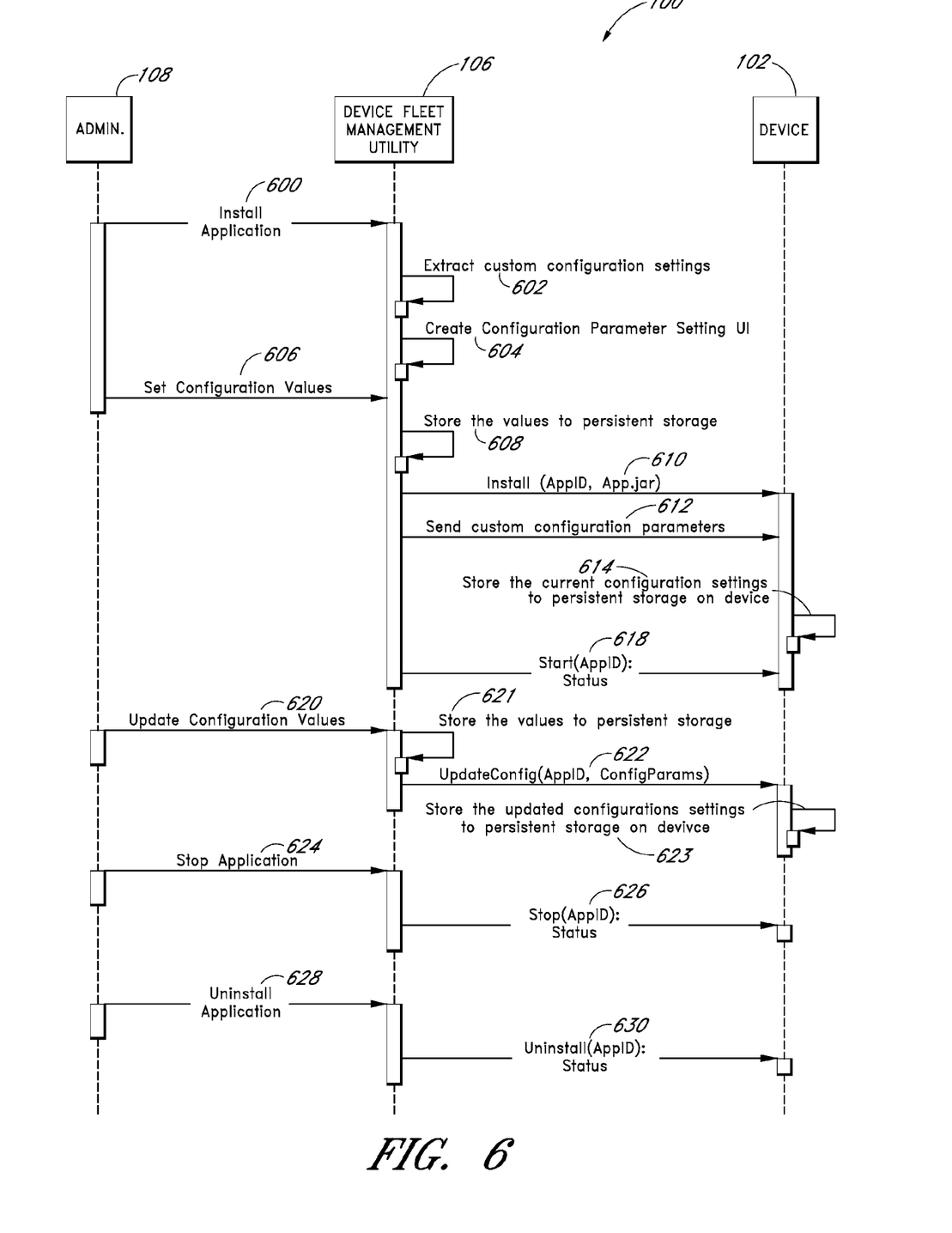
FIG. 6 illustrates a timing chart of one embodiment of remotely configuring custom applications over the lifecycle of an application on one device.

FIG. 6 illustrates a timing chart of one embodiment of remotely configuring custom applications over the lifecycle of an application on one device. In state 600, a user, such as an administrator, using a remote computer 108, instructs the device fleet management utility 106 to install an application. In state 602, the device fleet management utility 106 extracts the custom configuration settings. The procedure for unpacking the configuration parameters from the installation package is described in greater detail above with respect to FIG. 3 and also FIG. 5. In state 604, the device fleet management utility 106 creates, based on the extracted configuration information, a user interface for displaying and modifying configuration parameters of the installed application. The procedure for creating a user interface for configuration parameters is described in greater detail above with respect to FIGS. 3-5.

In state 606, the user sets the configuration values by, for example, changing default values displayed in the parameter setting user interface to user-specified values. In state 608, the device fleet management utility 106 stores these user-specified parameter values to persistent storage. As described above with respect to FIG. 5, in one embodiment, the parameter values are stored to persistent storage (such as non-volatile, battery-backed RAM) on the server device executing the device fleet management utility 106. In state 610, the device fleet management utility 106 sends an "Install" command to MFP 102, which then installs the respective custom application 110. This command includes two parameters: AppID, which is an identifier for the application to be installed, and App.jar, which is the installation package of files (a java archive or ".jar" file) for installing on the device. In state 612, the device fleet management utility then sends the custom configuration parameter values (including the user-specified values, as well as any remaining default values) to MFP 102. Then in state 614, MFP 102 stores these current configuration settings to persistent storage on the MFP 102. Although in the illustrated embodiment the application was not installed on the MFP 102 until having received custom configuration parameter values from the administrator, in other embodiments it is possible to install the application based default parameter values and then to update the application after receiving user-specified parameter values. It will be appreciated by one skilled in the art that there are multiple suitable ways in which to accomplish the various operations with respect to extracting configuration information, displaying a user interface reflecting that information to a user, and installing and application and/or updating an installed application based on the user-specified parameter values.

In state 618, the custom application 110 is automatically started. In other embodiments, the application may not automatically start following installation, but may instead wait until a user, such as an administrator, specifically starts the application. In some embodiments, this start command may be executed by a user, such as an administrator, via a remote computer, such as remote computer 108, or at the device itself, such as MFP 102. To start the application, the device fleet management utility 106 sends a "Start" command to the MFP 102, which includes a parameter "AppID," identifying the application to be started. During the execution of the application, the MFP 102 utilizes the configuration values set by the user.

The configuration values may be updated during the lifecycle of the application. For example, in state 620, a user updates the configuration values by, for example, using a user interface customized for the application's configuration parameters to enter new parameter values. Accordingly, in state 622, device fleet management utility 106 sends an "UpdateConfig" command to the MFP 102, with an "AppID" parameter to identify the custom application 110 and a data structure with the updated configuration parameters (illustrated here with a single parameter called "ConfigParams").

A user, such as an administrator, may choose to end the lifecycle of an application. For example, in state 624, an administrator using remote computer 108 instructs the device fleet management utility 106 to stop executing the respective custom application 110, and in state 626, the device fleet management utility 106 may then send a "Stop" command to MFP 102, with an "AppID" parameter to identify which application should be stopped. In some embodiments, the values for the configuration settings remain in persistent storage, both at the server device hosting the device fleet management utility 106 and at the MFP 102. When a user restarts the respective custom application, it may be executed with the previously defined configuration settings stored in persistent storages at the server host device and at the MFP 102. A user, such as an administrator, may also choose to uninstall an application. For example, in state 628, an administrator using remote computer 108 chooses to uninstall the application, and, in state 630, the device fleet management utility 106 sends an "Uninstall" command to the MFP 102, with an "AppID" parameter to indicate which application to uninstall. In some embodiments, when the application is uninstalled, the configuration settings and respective values are removed from the persistent storage, both at the server device hosting the device fleet management utility 106 and at the MFP 102.

Although in the embodiments described above, certain functions, modules, procedures, and so forth were expressly described as being associated with the remote computer 108, the device fleet management utility 106, or the MFP(s) 102, in other embodiments, other configurations are possible. In some embodiments, the device fleet management utility may be a combination of software and/or firmware modules executing on the remote computer 108 and/or the MFP(s) 102. For example, determining whether a custom application is configurable may be determined at a device remote to the MFP(s) 102, such as a device operating the device fleet management utility 106, instead of being determined at the MFP(s) 102.

Although this invention has been described in terms of certain embodiments, other embodiments that are apparent to those of ordinary skill in the art, including embodiments which do not provide all of the benefits and features set forth herein, are also within the scope of this invention. Accordingly, the scope of the present invention is defined only by reference to the appended claims.

What is claimed is:

1. A method of remote application configuration management, the method comprising:

evaluating a configuration flag for determining whether an application is configurable;

extracting configuration information based on the configuration flag for configuring the application corresponding to at least one device, the configuration information comprising configuration parameters;

configuring a user interface based on the extracted configuration information, wherein the user interface for corresponding with the at least one device;

receiving, via the user interface, parameter values corresponding to the configuration parameters;

synchronizing the parameter values and configuration information for reconciling a discrepancy;

saving the parameter values into a persistent storage; and sending the parameter values for uninstalling the application on the at least one device.

2. The method of claim 1, wherein the application is a custom application configured to operate on an MFP.

3. The method of claim 1, wherein the configuration information further comprises default values corresponding to the configuration parameters, and further comprises configuration rules for defining respective value types of the configuration parameters and for defining respective relationships between the configuration parameters.

4. The method of claim 1, wherein the configuration information is provided in at least one of the following formats: XML, key value pair with CSS, and XSLT.

5. The method of claim 1, wherein the persistent storage resides in at least one device.

6. The method of claim 1, further comprising, before extracting the configuration information, determining whether the application is configurable, wherein the determining comprises evaluating the configuration flag in an application manifest file.

7. A device fleet management utility comprising:

a processor configured to:

evaluate a configuration flag for determining whether the application is configurable, extract at least one configuration parameter based on the configuration flag from an application corresponding to at least one device, configure a user interface based on the at least one extracted configuration parameter, the interface module for receiving, via the user interface, at least one parameter value corresponding to the at least one extracted configuration parameter, send a server component configured to send the at least one parameter value to the at least one device having the application registered and for uninstalling the application on the at least one device, and a persistent storage, coupled to the processor, configured to synchronize the at least one parameter value and the at least one extracted configuration parameter for reconciling a discrepancy.

8. The device fleet management utility of claim 7, wherein the application is a custom application and the device is an MFP.

9. The device fleet management utility of claim 7, wherein the processor is further configured to extract at from the application at least one of the following: at least one default value corresponding to the at least one configuration parameter, at least one rule defining a value type of the at least one configuration parameter, and at least one rule defining a relationship of the at least one configuration parameter.

10. The device fleet management utility of claim 7, wherein the at least one configuration parameter is provided in at least one of the following formats: XML, key value pair with CSS, and XSLT.

11. The device fleet management utility of claim 7, wherein the processor is further configured to determine, before extracting the at least one parameter, whether the application is configurable by evaluating the configuration flag in an application manifest file.

12. A server having instruction modules stored thereon for managing application configuration on a remote device, the instruction modules comprising the device fleet management utility of claim 8.

13. A server having an MFP application with extractable configuration parameters, the server comprising:
   a persistent storage configured to store executable instructions configurable by at least one parameter for synchronizing parameter values and configuration information for reconciling a discrepancy; and
   a processor, coupled to the persistent storage, configured to:
      configure a user interface for receiving parameter values, the information including a configuration flag for determining whether an application is configurable, and
      send the parameter values for uninstalling the application on a device.

14. The MFP application of claim 13, wherein the information comprises at least one of the following: the at least one parameter, a default value corresponding to the at least one parameter, a rule for defining a value type of the at least one parameter, and a rule for defining a relationship between the at least one parameter and another parameter.

15. The MFP application of claim 13, wherein the information is provided in at least one of the following formats: XML, key value pair with CSS, and XSLT.

16. The MFP application of claim 13, wherein the MFP application includes an application manifest file comprising the configuration flag for indicating the MFP application as configurable.

17. A persistent storage having the MFP application of claim 13 stored thereon.

18. An MFP device configured to register applications remotely, the MFP device comprising:
   a processor configured to configure at least one configurable application comprising executable instructions configurable by at least one parameter, the at least one configurable application further comprising a configuration property file with information for configuring the at least one configurable application and for uninstalling an application, the information including a configuration flag for determining whether the application is configurable; and
   a persistent storage, coupled to the processor, configured to store the executable instructions configurable by at least one parameter for synchronizing parameter values and configuration information for reconciling a discrepancy.

19. The MFP device of claim 18, wherein the information comprises at least one of the following: the at least one parameter, a default value corresponding to the at least one parameter, a rule for defining value type of the at least one parameter, and a rule for defining a relationship between the at least one parameter and another parameter.

20. The MFP device of claim 18, wherein the information is provided in at least one of the following formats: XML, key value pair with CSS, and XSLT.

21. The MFP device of claim 18, wherein the at least one configurable application further comprises an application manifest file comprising the configuration flag indicating at least one configurable application as configurable.

* * * * *